April 14, 1936. G. TABOZZI 2,037,350
FLEXIBLE TUBE AND UNION
Filed Oct. 18, 1933
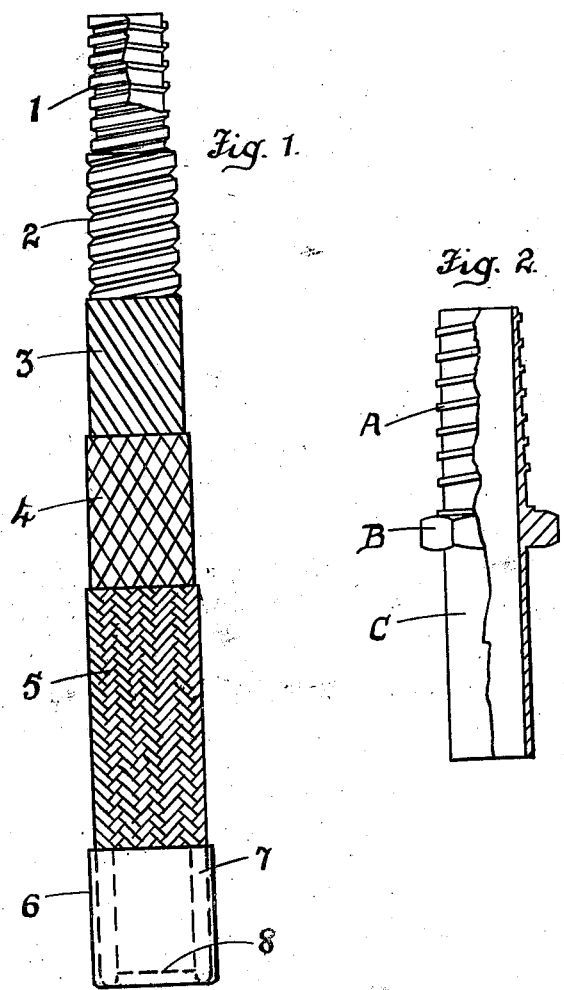
Inventor:

Patented Apr. 14, 1936

2,037,350

UNITED STATES PATENT OFFICE 2,037,350

FLEXIBLE TUBE AND UNION

Giacinto Tabozzi, Milan, Italy

Application October 18, 1933, Serial No. 694,131

1 Claim. (Cl. 138—58)

The present invention refers to improvements in flexible tubes and corresponding unions, especially for fuel and lubricant pipes in aeroplanes and wherever the said pipes are exposed to strong and continuous vibrations.

The flexible pipe, the object of the invention, is characterized firstly by the fact that an ordinary metallic flexible tube is covered by a band of a material known as "cellon" which consists of a derivative of cellulose chemically treated in order to make it waterproof and fireproof, hereinafter referred to as "cellon" or the like wound according to the revolutions of a helix, each of which has a breadth equal to the length of all the said flexible tube that is to say so that the revolutions of the helix of the wound "cellon" give rise to a species of tube without solution of continuity in the transverse direction, but they give rise only to unions in the longitudinal direction (at the beginnng and at the end of the winding). The tube formed by the "cellon" tube serves as a safety tube against eventual leakages of the liquid of the flexible metallic tube. In place of "cellon" other materials which have similar physico-chemical properties in view of the special employment can be used. The safety covering of "cellon" or the like is covered in its turn by a layer of vulcanized rubber with a view to prevent drying of the cellon and exclude external humidity. The said covering of rubber is subsequently covered by a layer of heat refractory material, in the form of woven mesh and varnish (for example amianthus, amianthite, its derivatives, its substitutes and its compositions). Following this there is a covering of metallic plait.

An appropriate union for such a tube consists of a metallic tubular piece, slightly conical, provided with helicoidal threads corresponding to those of the flexible tube, of a construction known per se, so that during the screwing there is a certain tendency to expansion of the tubular portion concerned in the union, producing a watertight adherence between the surfaces contributing to the water tightness. In order to release the said portion of the tube from the effects produced by the said expansion, a socket is employed which is threaded outside with exterior surface on the end of the tubes to be joined and its circular edge is curved against the exterior the curve forming the seat for the thickness of the head of the tube, and that by the projecting nut serving for the manipulation of the union.

In the accompanying drawing the invention is shown by way of example:

Fig. 1 shows the tube with its coverings placed successively from the beginning.

Fig. 2 shows the pertinent union to the said tube partly in section and partly in elevation.

In the figures of the drawing 1 is the known metallic flexible tube, which is made so due to the formation of a helicoidal groove formed by means of filling out its walls, 2 is the covering of "cellon" or other material having certain physico-chemical properties according to the use to which it is to be put.

The said covering of "cellon" being established by a single sheet of "cellon" wound according to the revolutions of a helix each of which has a breadth equal to the length of the flexible tube; 3 is a covering impermeable to moisture, serving to prevent the drying of the "cellon" as well as the action of the exterior moisture on it; 4 is a covering of refractory material serving for the thermal protection of the layer of vulcanized rubber, the said covering consisting of a mesh or of a varnish, using such materials for example, as amianthus, its derivatives its substitutes and its compositions. 5 designates a metallic plait of known form and use; 6 is an anti-expansive metallic socket provided with a curved back end 8, the width of this curve serving to form a seat for the thickness 7 of the end of the tube 1, including therein all the thicknesses 2, 3, 4, 5.

In Fig. 2 is shown a conical portion of a union C provided with a helicoidal thread of which the pitch corresponds to that of the flexible tube 1.

The union is provided with a projecting nut B.

The water tightness of the union is assured and rendered very effective by the pressure of the cone which acts in an expansive sense against the internal walls of the flexible tube, the expansive effect being contracted by the presence of the metallic socket 6 threaded on the head of the tube to be joined.

It is to be remarked that in the metallic flexible tubes used for the formation of the complex flexible pipe there is inserted between the individual layers, a thread of special cellulose or other material, insoluble and unattackable, in all cases unattackable by essence, benzol, mixtures of hydrocarbons in general, by hot oils or the like.

The details of construction may be varied in order to adapt it to different practical uses without abandoning the scope of the present invention.

I claim:

A flexible tube and union therefore comprising a flexible metal tube provided with a helical groove, a band of a cellulose derivative chemically treated to render it waterproof and fireproof helically wound around said flexible tube, a layer of vulcanized rubber placed over said helically wound band, a heat resisting coating applied to said layer of vulcanized rubber, a metallic plaited covering placed on said heat resisting coating, a hollow metal socket inserted over the end of said plaited covering, a union provided with a slightly conical extension and helicoidal thread thereon, screwed into said flexible tube, at the end on which the socket is fitted, and said socket resisting expansion of the flexible tube.

GIACINTO TABOZZI.